United States Patent
Huang

(10) Patent No.: US 10,935,519 B2
(45) Date of Patent: Mar. 2, 2021

(54) APPARATUS AND METHOD FOR SEPARATING MOLECULES

(71) Applicant: Advanced Electrophoresis Solutions Ltd, Kitchener (CA)

(72) Inventor: Tiemin Huang, Kitchener (CA)

(73) Assignee: Advanced Electrophoresis Solutions Ltd, Kitchener (CA)

(*) Notice: Subject to any disclaimer, the term of this patent is extended or adjusted under 35 U.S.C. 154(b) by 362 days.

(21) Appl. No.: 15/531,235

(22) PCT Filed: Dec. 2, 2015

(86) PCT No.: PCT/US2015/063555
§ 371 (c)(1),
(2) Date: May 26, 2017

(87) PCT Pub. No.: WO2016/090064
PCT Pub. Date: Jun. 9, 2016

(65) Prior Publication Data
US 2017/0363575 A1    Dec. 21, 2017

Related U.S. Application Data

(60) Provisional application No. 62/088,353, filed on Dec. 5, 2014.

(51) Int. Cl.
*G01N 27/447* (2006.01)
(52) U.S. Cl.
CPC .. *G01N 27/44743* (2013.01); *G01N 27/44721* (2013.01); *G01N 27/44752* (2013.01); *G01N 27/44795* (2013.01)

(58) Field of Classification Search
None
See application file for complete search history.

(56) References Cited

U.S. PATENT DOCUMENTS 3,520,874 A * 7/1970 Ueno .................. B01D 71/10
536/76
4,874,492 A * 10/1989 Mackay .......... G01N 27/44721
204/461

(Continued)

FOREIGN PATENT DOCUMENTS

CN    WO2013/032832    3/2013
FR    2827958          1/2003

OTHER PUBLICATIONS

Li et al. (Anal. Chem., 71, 3036-3045) (Year: 1999).*

(Continued)

*Primary Examiner* — Alexander S Noguerola
(74) *Attorney, Agent, or Firm* — Zhihua Han

(57) ABSTRACT

Apparatuses and methods for whole column imaging detection (WCID) capillary isoelectric focusing (CIEF). The apparatus includes a separation capillary having a separation inner diameter and a separation outer diameter; a base, wherein the separation capillary is anchored to the base; an inlet transfer capillary having an inlet inner diameter and an inlet outer diameter; and an outlet transfer capillary having an outlet inner diameter and an outlet outer diameter. The inlet transfer capillary, the separation capillary, and outlet transfer capillary are configured to be in fluidic communication with each other. The separation inner diameter exceeds the outlet inner diameter.

29 Claims, 5 Drawing Sheets

(56) References Cited

U.S. PATENT DOCUMENTS

2001/0054554 A1     12/2001  Pawliszyn
2002/0079257 A1*     6/2002  Zare ................. G01N 27/44704
                                                            210/198.2
2003/0052008 A1*     3/2003  Liu .................. G01N 27/44704
                                                              204/459

OTHER PUBLICATIONS

Zhen Liu et, al., Capillary Isoelectric Focusing of Proteins with Liquid Core Waveguide Laser-induced Fluorescence Whole Column Imaging Detection Anal. Chem. 2003, 75, 4887-4894.

* cited by examiner

APPARATUS AND METHOD FOR SEPARATING MOLECULES

CROSS REFERENCE TO RELATED PATENT APPLICATIONS

This application claims priority over U.S. Provisional Application No. 62/088,353, filed Dec. 5, 2014, titled "Apparatus and Method for Whole Column Imaging Detection Capillary Isoelectric Focusing," which is hereby incorporated by reference in its entirety.

TECHNICAL FIELD

The disclosure generally relates to the technical field of capillary isoelectric focusing for separating molecules such as proteins or other amphoteric biomolecules, and more particularly relates to an apparatus and method for whole column imaging detection (WCID) capillary isoelectric focusing (CIEF).

BACKGROUND

The separation and characterization of proteins and other amphoteric biomolecules is important in life-science research and industries. Isoelectric focusing (IEF) is a high resolution and concentration separation technology. IEF separates proteins and other biomolecules based on their surface charge. In IEF, amphoteric compounds migrate under electric field along the pH gradient generated by carrier ampholytes mixture until their surface net charge approach zero and are focused into zones with local pH equal to their isoelectric point (pI). IEF is used both for protein separation and as the first dimension of two dimensional complex protein separations. For example, IEF combines sodium dodecyl sulfate (SDS) gel electrophoresis (the separation mechanism is based on their molecular weight), known as two-dimensional gel electrophoresis (2-DE), has been employed in proteomics for protein separation and quantitation. Two-dimensional gel electrophoresis (2-DE), combining two orthogonal separation techniques, increases separation resolution of complex biomolecules. However, 2-DE is generally carried out in a polyacrylamide slab gel, which is labor-intensive, time consuming and hardly reproducible.

Whole column imaging detection (WCID) based capillary Isoelectric focusing (CIEF) facilitates the evolution of Isoelectric focusing from traditional labor-intensive and time consuming slab gel format to automatic and high throughput free solution capillary format. There are two CIEF technologies according to detection schemes. When detection is at a point close to one distal of the separation capillary, it is the single point detection (SPD). When detection occurs to the full separation capillary, it is the WCID. Capillary Isoelectric focusing (CIEF) is conducted in two steps in the single point detection (SPD). First, protein and carrier ampholytes mixture is injected into the entire separation capillary length. One end of the separation capillary and the anode of the high voltage power supply are immersed in a vial that is filled with an acidic solution, and the other end of the separation capillary and the cathode are immersed in a vial that is filled with a base solution. In this first focusing step, amphoteric molecules are separated and focused. Then, upon completion of focusing, focused stationary amphoteric molecules are mobilized to pass the detection point for detection. The mobilization can be achieved by applying pressure to the electrolyte vial or by changing the anolyte or catholyte. Changing the anolyte to a non-pure acidic solution will induce migration of the focused zones toward the anode, and changing the catholyte to a non-pure base solution will induce the migration of the focused zones toward the cathode. However, in conventional CIEF with SPD, the mobilization step often disturbs the established pH gradient in the focusing step. In addition, slow mobilization and smaller inner diameter capillary are utilized to minimize loss of resolution achieved in the focusing step, which reduces the analytical throughput and optical detection sensitivity.

Comparing to SPD CIEF, WCID CIEF simplifies method development and improve analytical throughput without the need of mobilization. However, currently WCID CIEF cannot provide direct isomeric protein peak characterization by direct introducing the separated protein elution to analytical tools such as mass spectrometry (MS). In addition, the inner diameter (id) of the available membrane capillary limits the selection of separation capillary. These drawbacks have limited broader application of WCID CIEF in protein separation and quantitation and prevented its application in proteomics.

UV absorbance detector is often used in WCID CIEF as a detection mean. The sensitivity of a UV absorbance detector is directly proportional to the sample absorbance at the detection wavelength and the light path length. The detection is often conducted at 280 nm, where proteins or other bio amphoteric molecules have a relatively weak absorbency. Because of the low detection sensitivity, the conventional WCID CIEF requires high sample concentration The high protein sample concentration leads to not only more sample consumption but also more frequent protein precipitations.

SUMMARY

The disclosure describes apparatuses and methods for performing for chemical and biological molecules separation. In one aspect, the disclosure provides apparatuses and methods for performing whole column imaging detection (WCID) capillary isoelectric focusing (CIEF). In one embodiment, the disclosure provides an apparatus for separating a mixture. The apparatus includes a separation capillary having a separation inner diameter and a separation outer diameter; a base, wherein the separation capillary is anchored to the base; an inlet transfer capillary having an inlet inner diameter and an inlet outer diameter; and an outlet transfer capillary having an outlet inner diameter and an outlet outer diameter. The inlet transfer capillary, the separation capillary, and outlet transfer capillary are configured to be in fluidic communication with each other. The separation inner diameter exceeds the outlet inner diameter.

The separation capillary may include a porous material. In one embodiment, the separation capillary includes fused silica. The separation capillary may include a coating. For example, the separation capillary may include fused silica with a coating. The coating may be hydrophobic or hydrophilic.

The separation inner diameter may exceed the inlet inner diameter. In some embodiments, the separation inner diameter may be at least twice, at least three times, or at least four times of the inlet inner diameter. The separation inner diameter may be about the same or exceed the inlet outer diameter. For example, the separation inner diameter may be at least twice or at least three times of the inlet outer diameter.

The separation inner diameter may exceed the outlet inner diameter. For example, the separation inner diameter is at least twice, at least three times, at least four times, or at least five times of the outlet inner diameter. The separation inner diameter may be about the same as or exceed the outlet outer diameter. For example, the separation inner diameter may be at least twice, at least three times, or at least four times of the outlet outer diameter.

The inlet transfer capillary may be connected to a first end of the separation capillary to provide an inlet connection. For example, the inlet transfer capillary may be inserted into the first end of the separation. The outlet transfer capillary is connected to a second end of the separation capillary to provide an outlet connection. For example, the outlet transfer capillary may be inserted into the second end of the separation capillary. The inlet connection and the outlet connection may be independently filled with a sponge material. The sponge material may be electric conductive, ion conductive, or both. The sponge material may include a polymer material. The sponge material may be formed in situ. The inlet connection and outlet connection may be independently stabilized with an adhesive, such as epoxy glue.

The apparatus may further include a first reservoir for holding a first electrolyte and a second reservoir for holding a second electrolyte. The first reservoir may be in fluidic communication with the inlet connection. The second reservoir may be in fluidic communication with the outlet connection.

The apparatus may further include a first electrode and a second electrode. The first electrode is configured to be in electric communication with the first electrolyte. The second electrode is configured to be in electric communication with the second electrolyte.

The apparatus may further include an electric power source that is configured to be in electric communication with the first electrode and the second electrode hence is configured to provide a voltage across the separation capillary.

The separation capillary, the first reservoir, and the second reservoir may be affixed to a base to provide a cartridge. The base may take a shape of a plate. The based may be made of materials including ceramic, glass, polymer, plastic, metal, or a combination thereof. The separation capillary may be glued onto the base.

The outlet transfer capillary may be in fluidic communication with an analytic instrument, a separation device, or a combination thereof. The analytic instrument may include MS, IR, UV, Raman spectrometer, or a combination thereof. The separation device may include a protein fractionation device.

In another aspect, the disclosure provides a system including the above-described apparatus and further including an image sensor. The imaging sensor may include a linear charge coupled device, a linear complementary metal-oxide-semiconductor sensor, or both. The imaging sensor may be configured to be in electronic communication with an image analysis device. The system may further include a sample injection device in fluidic communication with the inlet transfer capillary or/and an analytic instrument in fluidic communication with the outlet transfer capillary.

The image analysis device, the sample injection device and the communication device may be independently or centrally controlled by a computerized processor. Alternatively or in addition, the power source, the separation device and the analytic instrument may also be independently or centrally controlled by the computerized processor.

The objectives and advantages of the disclosure will become apparent from the following detailed description of preferred embodiments thereof in connection with the accompanying drawings.

BRIEF DESCRIPTION OF THE DRAWINGS

Embodiments according to the present disclosure will now be described with reference to the figures, in which like reference numerals denote like elements.

DETAILED DESCRIPTION

Figure 1:
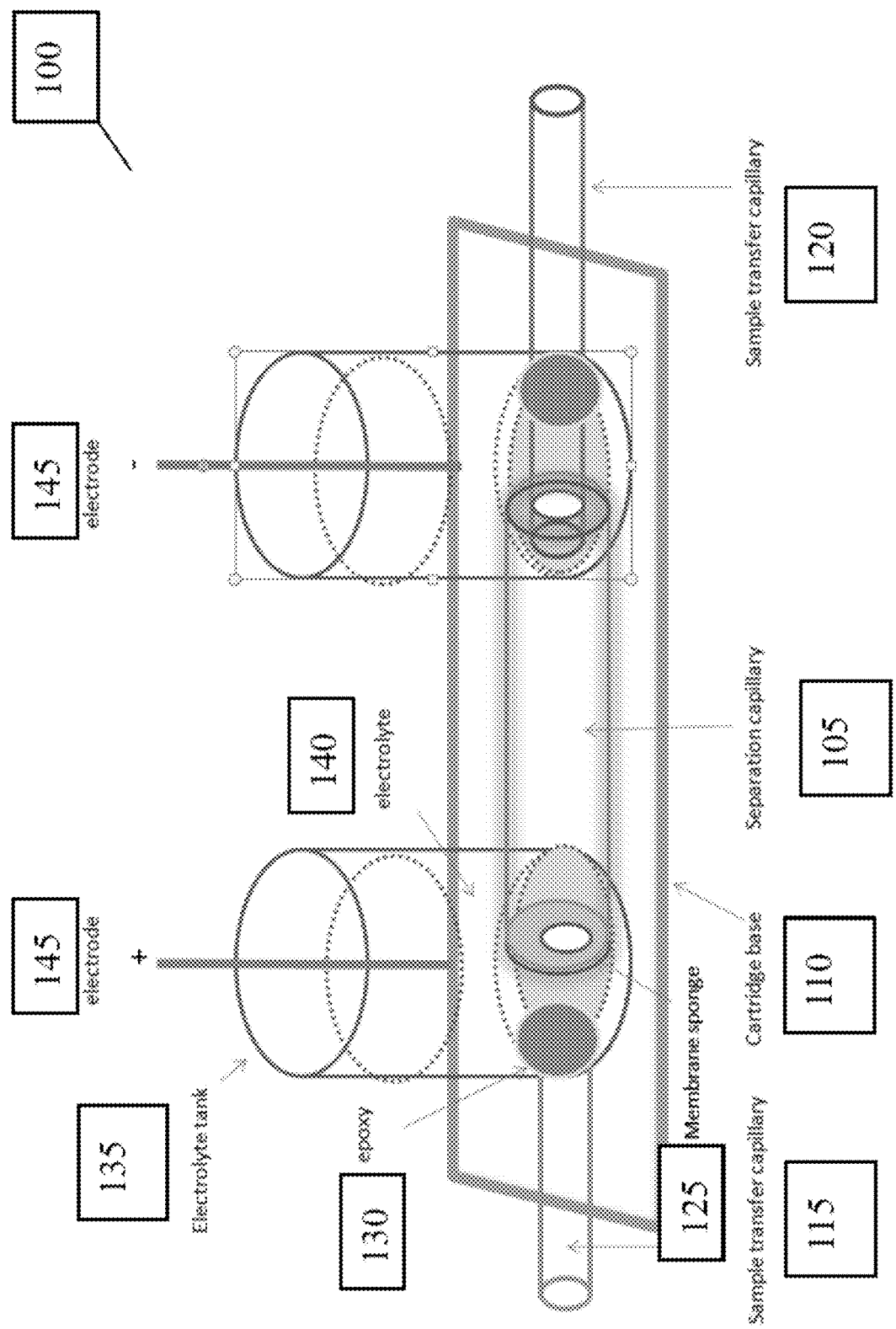
FIG. 1 shows schematic diagram of an example apparatus for high sensitivity UV absorbance WCID in accordance with one embodiment of the disclosure.

The present disclosure may be understood more readily by reference to the following detailed description of certain embodiments of the disclosure.

Throughout this application, where publications are referenced, the disclosures of these publications are hereby incorporated by reference, in their entireties, into this application in order to more fully describe the state of art to which this disclosure pertains.

The disclosure provides separation apparatus and methods with advantages over the drawbacks associated with the traditional isoelectric focusing technology.

In one aspect, an apparatus for separating a mixture is provided. The mixture may be a mixture of amphoteric biomolecules such protein molecules. Example protein molecules may include, without limitation, antibodies or enzymes. The apparatus includes a separation capillary having a separation inner diameter and a separation outer diameter; a base, wherein the separation capillary is anchored to the base; an inlet transfer capillary having an inlet inner diameter and an inlet outer diameter; and an outlet transfer capillary having an outlet inner diameter and an outlet outer diameter. The inlet transfer capillary, the separation capillary, and outlet transfer capillary are configured to be in fluidic communication with each other. The separation inner diameter exceeds the outlet inner diameter.

The separation capillary may have a length exceeding 30 mm, 50 mm, 100 mm, or 200 mm. In one embodiment, the separation capillary may have a length from about 10 mm to about 500 mm, from about 50 mm to about 300 mm, or from about 100 mm to about 200 mm. In one example, the separation capillary has a length of about 53 mm.

The separation capillary includes a porous material. In one embodiment, the separation capillary includes fused silica. The separation capillary may have a coating. In one embodiment, the separation capillary includes fused silica with a coating. The coating may be hydrophobic or hydrophilic. Example coatings include, but not limited to, fluorocarbon, polyacrylamide, dimethylsiloxane, or a combination thereof. The coating may be a molecular layer coating, a bonded coating, or a coating grafted to the inner surface the capillary. In one embodiment, the coating is substantially free of methyl cellulose additive.

The coating may have a thickness not exceeding 0.5 um. In some embodiments, the coating may have a thickness from about 0.01 um to about 1 um or from about 0.05 um to about 0.2 um. In one example, the coating may have a thickness of about 0.1 um.

The separation inner diameter may be at least about 30 um or at most about 1000 um. In some embodiments, the separation inner diameter may be from about 50 μm to about 400 μm or from about 100 μm to about 300 μm. In one embodiment, the separation inner diameter may be about 100 um. In another embodiment, the separation inner diameter may be about 200 um.

The separation outer diameter may be at least 50 um or at most 2000 um. In some embodiments, the separation outer diameter may be from about 100 μm to about 600 μm, from about 200 μm to about 500 μm, or from about 300 μm to about 400 μm. In one embodiment, the separation outer diameter is about 200 to 1000 μm.

The separation inner diameter may exceed the inlet inner diameter. For example, the separation inner diameter may be at least twice, at least three times, at least four times the inlet inner diameter. The separation inner diameter may be about the same or exceed the inlet outer diameter. For example, the separation inner diameter may be at least twice or at least three times of the inlet outer diameter.

The inlet inner diameter may be at least 10 um or at most 500 um. In some embodiments, the inlet inner diameter may be from about 20 μm to about 200 μm or from about 50 μm to about 150 μm. For example, the inlet inner diameter is about 100 to 800 μm. The inlet outer diameter may be at least 30 um or at most 500 um. In some embodiments, the inlet outer diameter is from about 30 μm to 300 μm or from 50 μm to 200 μm. In one example, the inlet outer diameter is about 100 to 800 μm.

The inlet transfer capillary may have a length exceeding about 30 mm or about 100 mm. In one embodiment, the inlet transfer capillary may have a length from about 100 mm to about 300 mm. For example, the inlet transfer capillary has a length of about 10 to 500 mm.

The separation inner diameter may exceed the outlet inner diameter. In some embodiments, the separation inner diameter may be at least twice, at least three times, at least four times, or at least five times of the outlet inner diameter. The separation inner diameter may about equal to or exceed the outlet outer diameter. In some embodiments, the separation inner diameter is at least twice, at least three times, or at least four times of the outlet outer diameter.

The outlet inner diameter may be at least 10 um or at most 500 um. In some embodiments, the outlet inner diameter is from about 30 μm to about 200 μm, from about 50 μm to about 100 μm or from about 30 μm to 250 μm. In one example, the outlet inner diameter is about 30 100 μm. The outlet outer diameter may be at least 30 um or at most 500 um. In some embodiments, the outlet outer diameter is from about 30 μm to 300 μm or from about 50 μm to about 200 μm. In one example, the outlet outer diameter is about 100 to 400 μm.

In some embodiments, the outlet transfer capillary has a length exceeding 30 mm, 50 mm, 100 mm, 200 mm, 300 mm, or 400 mm. In some embodiments, the outlet transfer capillary has a length from about 30 mm to about 600 mm or about 100 mm to about 600 mm. In one example, the outlet transfer capillary has a length of about 10 to 1000 mm.

The length of the separation capillary may the same, longer than, shorter than the outlet transfer capillary. In some embodiments, the length of the outlet transfer capillary is about the same as, at least twice, at least three time, or at least four times of the length of the separation capillary.

The inlet transfer capillary may be connected to one end of the separation capillary to provide an inlet connection. In one example, the inlet transfer capillary may be inserted into the separation capillary to provide a zero dead volume inlet connection. The outlet transfer capillary may be connected to the other end of the separation capillary to provide an outlet connection. For example, the outlet transfer capillary may be inserted into the separation capillary to provide a zero dead volume outlet connection.

The inlet connection and the outlet connection may be independently filled with a sponge material. The sponge material may include a polymer material including without limitation cellulose, cellulose acetate, porous frit, cuprammonium RC, or a combination thereof. The sponge material may be formed in situ, for example, by contacting a basic solution with cellulose acetate gel to provide a regenerated cellulose sponge.

The inlet connection and outlet connection may be independently stabilized with an adhesive. In one example, the adhesive may be epoxy glue.

The apparatus may further include a first reservoir for holding a first electrolyte. The first reservoir may be in fluidic communication with the inlet connection. The apparatus may also include a first electrode, which is configured to be in electric communication with the first electrolyte. The apparatus may further include a second reservoir for holding a second electrolyte. The second reservoir may be in fluidic communication with the outlet connection. The apparatus may also include a second electrode, which is configured to be in electric communication with the second electrolyte. The first electrolyte and the second electrolyte may be independently acidic or basic solutions. Example acidic solutions include without limitation acetic acid solution. Example basic solutions include without limitation ammonium solution.

In one embodiment, the reservoirs may be constructed over the inlet connection and the outlet connection. The first reservoir may be the anionic reservoir filled with, for example, an acidic solution and the second reservoir may be the cathodic reservoir filled with, for example, a base solution. The sponge material at the inlet and the outlet connections may be ion conductive, electric conductive or both, therefore allowing the electrical connection between the separation capillary and the electrolytes while limit the bulk flow between the separation capillary and the electrolyte reservoirs. With both the inlet and outlet connections are immersed in their corresponding electrolyte reservoirs, focusing proteins inside the separation capillary can be achieved when an electric voltage is applied to the first and the second electrode inside the first and the second electrolyte reservoirs. The separation capillary may be monitored with an imaging sensor, such as a linear charge coupled device (CCD) or a linear complementary metal-oxide-semiconductor (CMOS) sensor.

The base may be manufactured from materials such as ceramic, glass, polymer, plastic, metal, or a combination thereof. The separation capillary may be glued onto the base. In one example, the base may include an optical aperture and the separation capillary may be aligned to the optical aperture to allow the observation of the separation capillary. The first reservoir or the second reservoir may also be affixed to the base to provide a cartridge.

The outlet transfer capillary may be in fluidic communication with an analytic instrument, a separation device, or a combination thereof. Example separation device may include a protein fractionation device or online enzyme digestion device. Example analytic instrument may include, without limitation, MS (including, for example, ESI MS or MALDI MS), IR, UV, Raman spectrometer, or a combination thereof. One of the advantages of the disclosed technology is that the apparatus can be coupled to a mass spectrometry (MS).

In another aspect, the disclosure provides a system for separating a mixture. The system includes an apparatus as described above and an imaging sensor. The imagine sensor is configured to monitor the separation capillary. The imaging sensor may include, without limitation, a linear charge coupled device or a linear complementary metal-oxide-semiconductor sensor. The imaging sensor may be configured to be in electronic communication with an image analysis device.

The system may further include a sample injection device in fluidic communication with the inlet transfer capillary, an analytic instrument in fluidic communication with the outlet transfer capillary, or both. The system may be centrally controlled by a computer. For example, the image analysis device, the sample injection device and the communication device may be configured to be in electronic communication with a central processor.

In a further aspect, the disclosure provides methods for using the apparatus and systems. In one embodiment, the method includes the steps of placing the first electrolyte into the first reservoir, placing the second electrolyte into the second reservoir, loading a mixture into the separation capillary, and applying an electric voltage over the first electrode and the second electrode. The mixture may be any mixture that needs to be separated including a protein mixture or other amphoteric biomolecule mixtures. The methods may further includes monitoring the separation capillary with an image sensor, analyzing data from the image sensor, moving a separated sample into an analytical instrument such as MS for analysis or characterization, collecting a separated sample using a fractionation device, or any combination of these steps.

In a further aspect, the disclosure provides methods for making the apparatus and systems. In one embodiment, the method includes affixing the separation capillary onto a base, connecting inlet transfer capillary to the one end of the separation capillary to provide an inlet connection, and connecting the outlet transfer capillary to the other end of the separation capillary to provide an outlet connection. The inlet transfer capillary, the separation capillary, and outlet transfer capillary are configured to be in fluidic communication with each other. The method may further include forming a sponge membrane in situ at the inlet connection, the outlet connection, or both, sealing the outlet connection with an adhesive, sealing the inlet connection with an adhesive, construction a first reservoir over the inlet connection, or construction the second reservoir over the outlet connection. The steps may be performed in any combinations and in any combination of orders.

Figure 2:
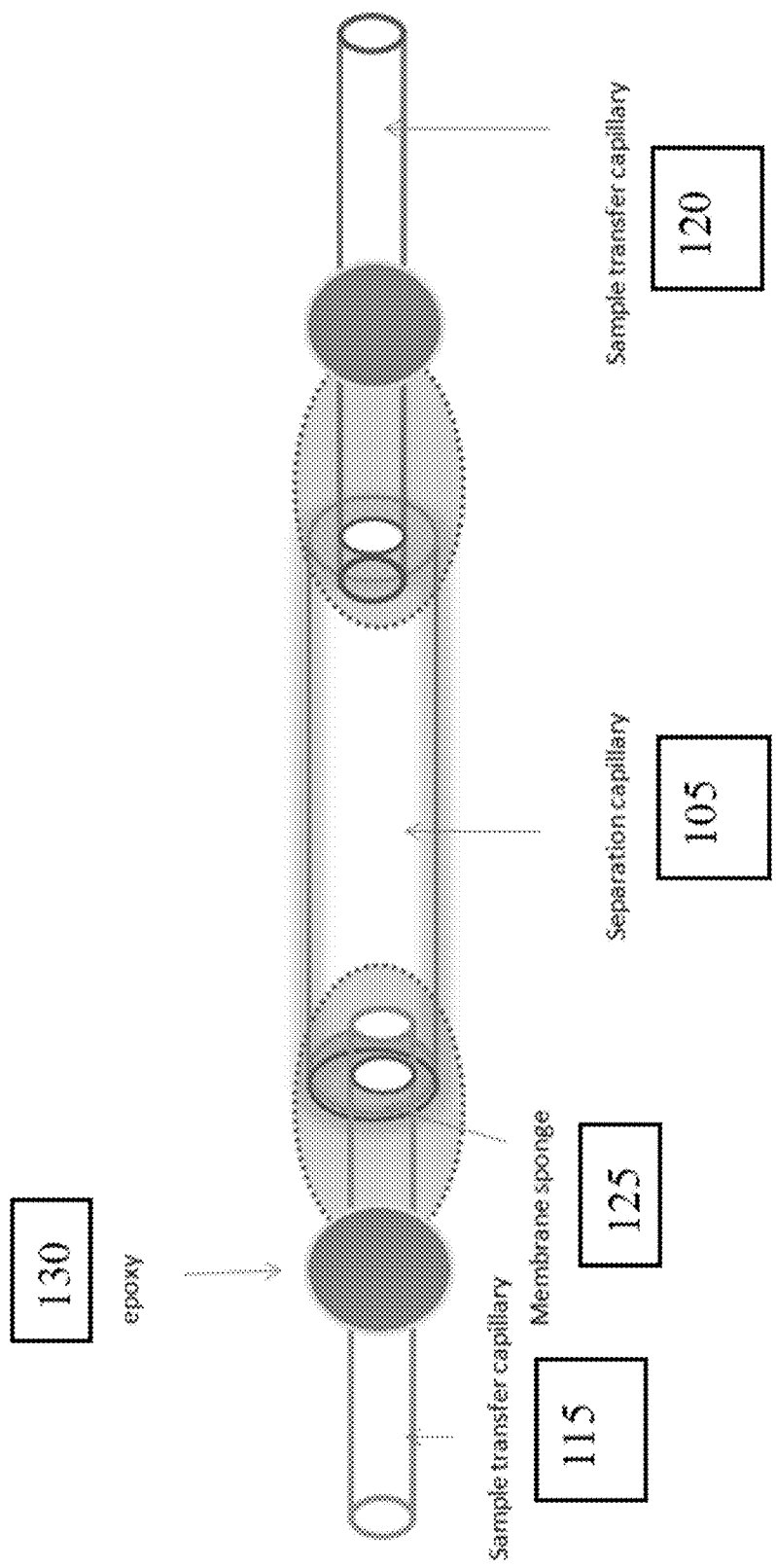
FIG. 2 shows the enlarged separation capillary connection section of FIG. 1.

In one example, the apparatus is in a cartridge format to facilitate electric connection, optical alignment, temperature control, capillary handling, and optical imaging detection. FIG. 1 shows one embodiment of the apparatus 101. A separation capillary 105 with fused silica that has a length of 55 mm, the inner diameter of 200 μm, and the outer diameter of 350 μm was glued to a base 110 comprising a piece of ceramic, glass, or plastic plate. The separation capillary 105 was aligned to the optical aperture of the base 110 and glued to base 110. One of the advantages of using ceramic plate is that it provides both support and heat sink for the separation capillary 105 due to, at least in part, its physical strength, good heat conductivity, and much larger surface area. Two pieces of the capillary about 150 mm long having an inner diameter about 100 um and the outer diameter about 180 μm were inserted into each end of the separation capillary 105 for about 0.5 mm deep, as the inlet transfer capillary 115 and the outlet transfer capillary 120, respectively. Proper amount of cellulose acetate solution in acetone was dripped into the connection so that the gel filled and covered the space between the larger inner diameter of the separation capillary 105 and the smaller outer diameter of both the inlet transfer capillary 115 and the outlet transfer capillary 120. After drying briefly, 1 M sodium hydroxide solution was dripped over the gel, converting the cellulose acetate to regenerated cellulose (RC) sponge 125. Epoxy glue 130 was applied to the RC sponge 125 outside the connection to prevent its movement. The connection is shown in detail in FIG. 2.

Circular glass or plastic tanks 135 were glued to the base 110 to cover both connections and to work as reservoirs for electrolytes. When electrolytes 140 are filled into the tanks, they are isolated from the sample mixture by the RC sponge 125. An electric voltage supply connected across two electrodes 145 that are immersed in the tanks 135. The advantages of onsite formation of RC sponge 125 include without limitation substantially zero dead volume at the connections between the capillaries, large selections of separation and transfer capillary dimensions, independent of commercial availability of membrane capillaries (which is used in conventional WCID CIEF), and selection of desired barrier properties of the onsite sponge 125. Although RC sponge 125 is made from cellulose acetate, other techniques for forming membrane, such as onsite porous frit formation, cuprammonium RC and other membrane formations with polymer materials, can be applied for the same purpose.

Figure 3:
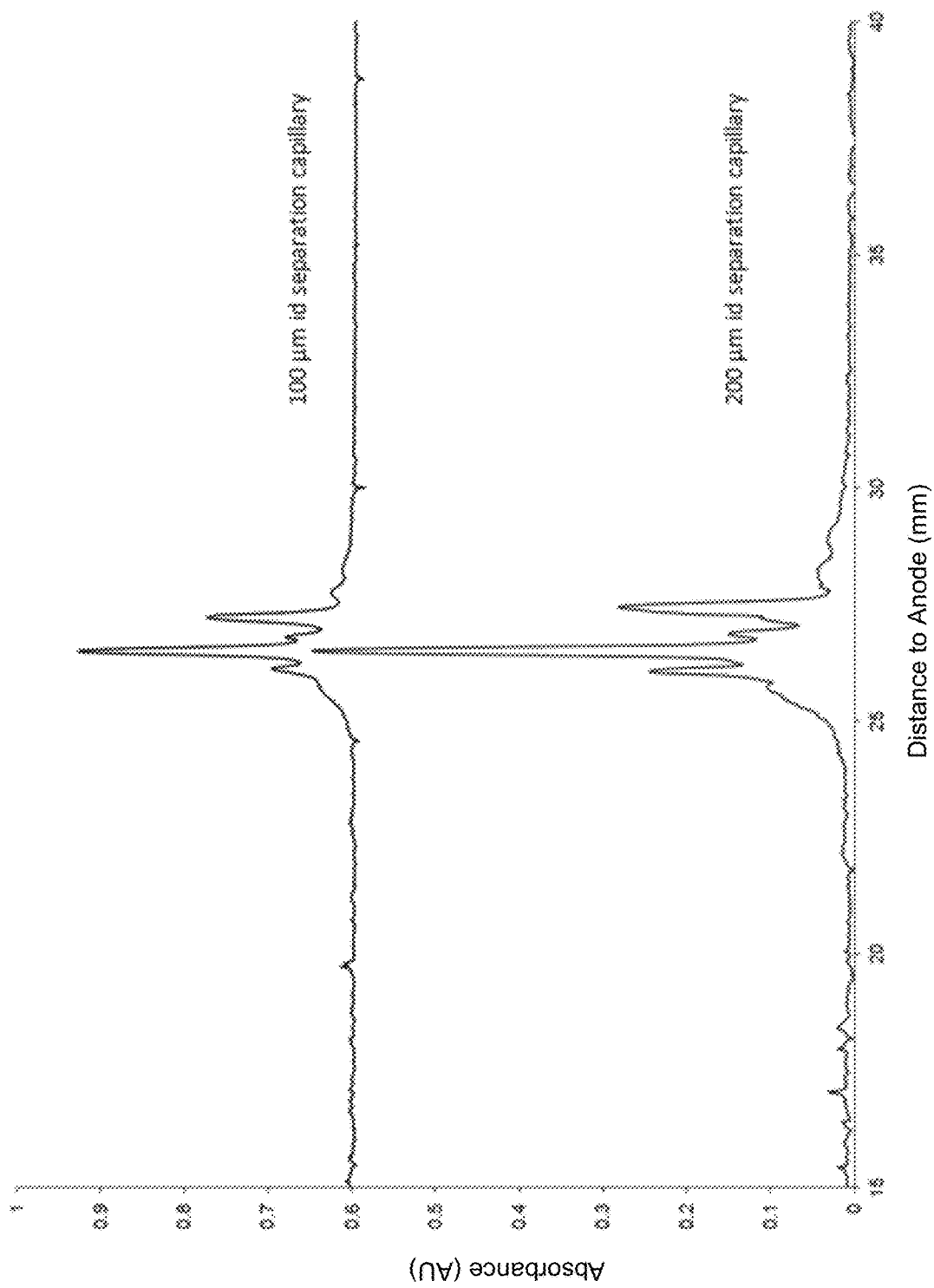
FIG. 3 illustrates the detection sensitivity of the example WCID CIEF with the separation capillary having an inner diameter as 100 μm and 200 μm, respectively.
Figure 4:
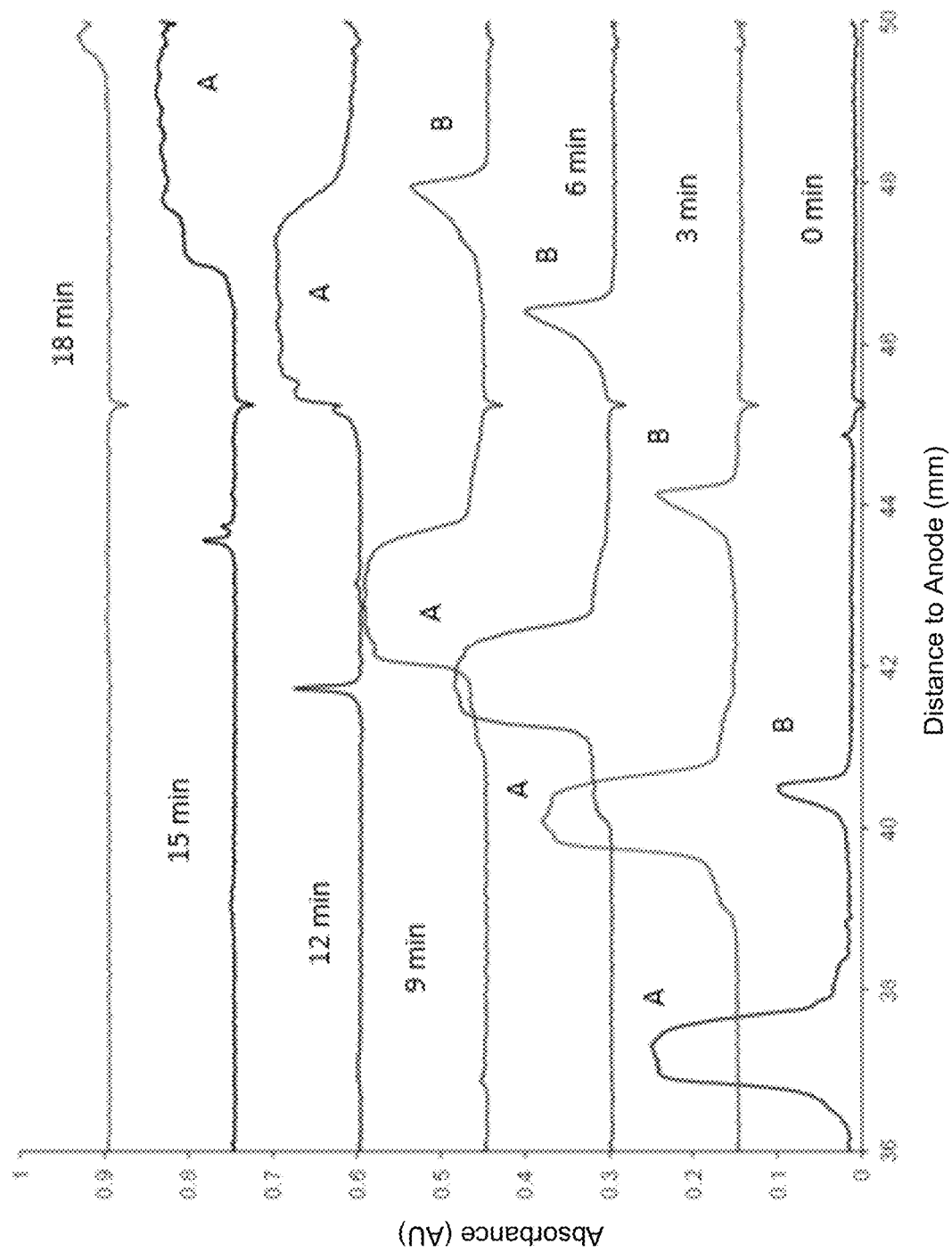
FIG. 4 illustrates the movement of focused protein peaks inside an example WCID CIEF with the separation capillary having an inner diameter as 200 μm toward the outlet transfer capillary having an inner diameter as 50 μm for ESI MS.

FIG. 3 illustrates the detection sensitivity improvement by a larger inner diameter separation capillary in a representative apparatus. The separation capillary was coated with polyacrylamide to minimize protein adsorption on the wall of the capillary and electroosmotic flow. Protein was mixed with 4% Aeslyte™ (e.g., carrier ampholytes) pH 3-10 carrier ampholytes to 200 μL aqueous solution to provide a protein sample mixture. After centrifugation, the protein sample mixture was injection into the capillaries of the cartridge, which is fixed in a whole column detection CIEF instrument CEInfinite™. Upon application of programmable electric voltage across the capillaries, amphoteric molecules migrate until their surface charges are lost where local pH is equal to their isoelectric point. A line of light scanned through the separation capillary, and the light intensity variation from the separation capillary was collected through a high resolution imaging lens to a linear CMOS imaging sensor. The collected data were processed with CE Insight control software and displayed at absorbance along the length of the separation capillary.

There are several advantages with the apparatus disclosed herein. Capillaries with different diameters can be used as the separation capillary. For example, when 200 μm inner diameter separation capillary is used, it provides 100% sensitivity improvement over 100 μm inner diameter separation capillary and 300% over 50 μm inner diameter separation capillary. In the disclosed WCID CIEF cartridge, the transfer capillary, i.e., both the inlet transfer capillary and the outlet transfer capillary are much longer than that of the separation capillary. Consequently, most of the sample mixture is in the inlet and outlet capillaries. The injection sample value for the 200 μm inner diameter separation capillary is about the same as that of the 50 or 100 μm inner diameter separation capillary when 50 μm inner diameter capillary is used as the transfer capillary. In addition, because of the detection sensitivity improvement, protein concentration can be lower in the larger separation capillary, which leads to advantages such as, among others, reduced risk of protein precipitation and improve separation.

The apparatus in a cartridge format may facilitate electric connection, optical alignment, temperature control, capillary handling, and MS connection. The cartridge construction is substantially similar to the example apparatus as shown in FIG. 1. A capillary of about 55 mm long having an inner diameter of 200 μm and an outer diameter of 350 μm was used as the separation capillary. A capillary of about 150 mm long with an inner diameter of 50 um and an outer diameter of 180 μm was used as the inlet transfer capillary. A capillary of about 750 mm long with an inner diameter of 50 um and an outer diameter of 180 μm was used as the outlet transfer capillary. Proteins were mixed with 0.5% pH 6-9 Aeslyte™ carrier ampholytes aqueous solution to provide a protein sample mixture, which was injected into the separation capillary. 2% acetic acid was filled to the anodic reservoir as the anolyte and 2% ethylenediamine was filled to the cathodic reservoir as the catholyte. An electric voltage power supply connected two electrodes each being immersed in a reservoir. The inlet transfer capillary was connected to a 50 μL syringe that is filled with 2% acetic acid in a Harvard Apparatus syringe pump after protein sample injection. The outlet end of the capillary was connected to ESI source of MS. Upon application of an electric voltage, amphoteric molecules migrated until their surface charges were lost where local pH is equal to their isoelectric point. A CMOS imaging camera monitored the separation capillary at a time interval such as 1 s to 60 s. Once desired protein resolution is observed, the syringe pump was switched on at a flow rate of 0.05 μL/min. At the same time, the electric voltage was adjusted such that the protein zones move toward the outlet transfer capillary sequentially, preserving the separation resolution. FIG. 3 illustrates two protein peaks moved sequentially out of the separation capillary. With this cartridge, the inner diameter of the separation capillary is about 4 times of the inner diameter of the outlet transfer capillary. When 1 mm of protein zone from the separation capillary is forced into the outlet transfer capillary, it will occupy about 16 mm in length. The process to transfer a small section of focused protein into a much longer section effectively minimizes the potential remixing of separated proteins inside the transfer capillary. The separation capillary and the electric voltage power supply for CIEF formed a closed circuit. The transfer capillary is effectively isolated from the high voltage source, preventing the interference of the electric voltage applied to CIEF process to the electric voltage applied to the ESI source. This electrical isolation facilitates the coupling of the CIEF process to the ESI process.

Pressure mobilization can be combined with chemical mobilization to force the focused protein zones into the transfer capillary. After protein focusing, the catholyte may be changed to a non pure base solution, which will induce the migration of focused protein zones toward the cathode upon electric field. Combining pressure and chemical mobilization can also transfer the separated protein zone into the transfer capillary and to the ESI source of MS.

Figure 5:
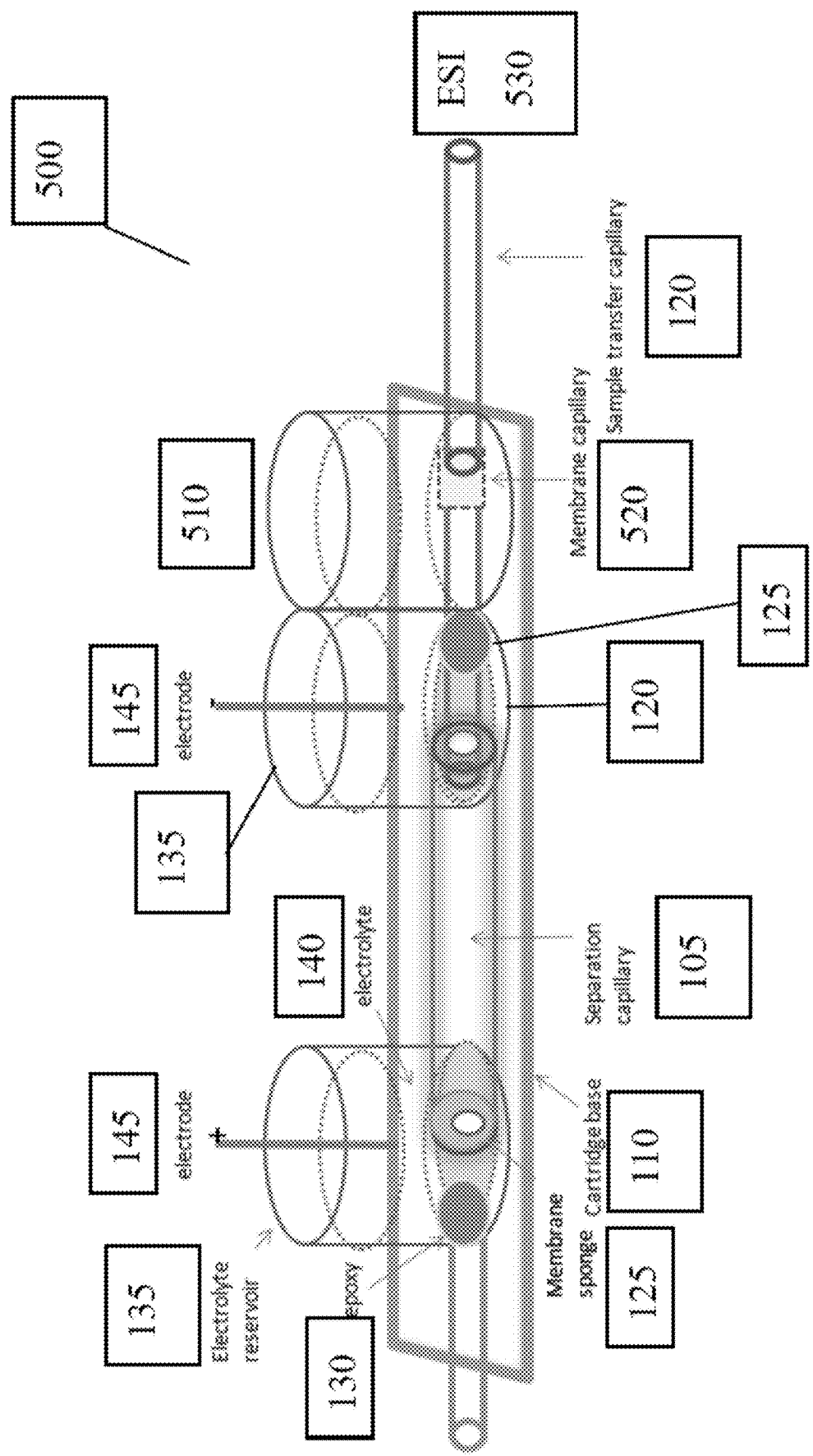
FIG. 5 shows an example apparatus for WCID CIEF with ESI-MS.

FIG. 5 illustrates an example apparatus 500 similar to that of FIG. 1, further including a third reservoir 510 to the cathodic side of the separation cartridge. The transfer capillary 120 can be connected to another piece of transfer capillary 120 with the same outer diameter (od) through a piece of membrane capillary 520. The membrane capillary 520 has an inner diameter not larger than that of the transfer capillary 120, and is used to connect to the ESI source 530. Fill the reservoir 510 with acetic acid solution and the acetic acid solution will leak into the outlet transfer capillary 120 through the porous membrane capillary 520. The mixing of protein with acetic acid solution will facilitate protein ionization in ESI sources.

The example apparatus illustrated in FIG. 5 can be used for protein fractionation and spotting to MALDI target plate. Once protein is focused and separated, a syringe pump with a 50 μL syringe filled with anolyte may be turn on, with a flow rate of 0.05-0.1 μL/min. The focused protein zones inside the 200 μm inner diameter separation capillary will be continuously pushed out to the 50 μm inner diameter outlet transfer capillary. During syringe mobilization, the electric field can be adjusted to preserve the separation resolution. The difference between the inner diameter of separation capillary and the inner diameter of the transfer capillary minimizes the remixing of separated protein isomers. Therefore, the resolution achieved during CIEF will be substantially preserved. The longer and smaller transfer capillary, combined with electrical isolation between the separation capillary and the transfer capillary facilitates the reliable application of the disclosed WCID CIEF to fields such as but not limited to protein fractionation and spotting the separated protein elution to a MALDI target plate.

The present disclosure is in the technical field of capillary isoelectric focusing separation of proteins and other amphoteric biomolecules. It can be used in life sciences fields in general, including for example cell line selection, stability investigation, formulation study, protein isomer characterization, lot release quality control and proteomics research.

There are several advantages with the disclosed technology including, but not limited to: more selection of separation capillary with different diameters; higher detection sensitivity with larger inner diameter separation capillary; construction of capillary cartridge isn't limited by the commercial availability of membrane capillary; zero dead volume connection of the separation capillary and transfer capillary, which minimize sample carry over; the apparatus, for the first time, allows direct coupling of WCID to ESI MS, coupling to MALDI MS, and high resolution protein fractionation.

While the disclosure has been described with reference to particular embodiments, it will be understood that the embodiments are illustrative and that the disclosure scope is not so limited. Alternative embodiments of the present disclosure will become apparent to those having ordinary skill in the art to which the present disclosure pertains. Such alternate embodiments are considered to be encompassed within the scope of the present disclosure. Accordingly, the scope of the present disclosure is defined by the appended claims and is supported by the foregoing description.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:
1. An apparatus for separating a mixture, comprising:
a separation capillary having a length from about 10 mm to 300 mm, wherein the separation capillary has a separation inner diameter and a separation outer diameter;
a base, wherein the separation capillary is anchored to the base;
an inlet transfer capillary having an inlet inner diameter and an inlet outer diameter; and
an outlet transfer capillary having an outlet inner diameter and an outlet outer diameter,
wherein the separation inner diameter is at least twice both the inlet inner diameter and the outlet inner diameter;
wherein the inlet transfer capillary is inserted into a first end of the separation capillary to provide an inlet connection;
wherein the outlet transfer capillary is inserted into a second end of the separation capillary to provide an outlet connection and wherein the first end is opposite from the second end;
wherein the separation inner diameter exceeds the inlet outer diameter leaving a first space between the separation inner diameter and the inlet outer diameter;
wherein the separation inner diameter exceeds the outlet outer diameter leaving a second space between the separation inner diameter and the outlet outer diameter;
wherein both the first space and the second space are filled with a sponge material, wherein the sponge material is configured to allow fluidic communication through the inlet connection and the outlet connection respectively;
wherein the outlet transfer capillary has a length from about 30 mm to about 750 mm and is at least twice longer than the separation capillary; and
wherein the inlet transfer capillary, the separation capillary, and outlet transfer capillary are configured to be in fluidic communication with each other.
2. The apparatus of claim 1, wherein the separation capillary comprises fused silica with a coating.
3. The apparatus of claim 2, wherein the coating is hydrophobic or hydrophilic.
4. The apparatus of claim 2, wherein the coating comprises fluorocarbon, polyacrylamide, dimethylsiloxane, or a combination thereof.
5. The apparatus of claim 1, wherein the separation inner diameter is about 200 μm and wherein the separation outer diameter is about 350 μm.
6. The apparatus of claim 5, wherein each of the inlet transfer capillary and the outlet transfer capillary has the inner diameter of about 50 μm and the outer diameter of about 180 μm.
7. The apparatus of claim 6, wherein the inlet transfer capillary is about 150 mm long and the outlet transfer capillary is about 750 mm long.
8. The apparatus of claim 1, wherein the outlet transfer capillary is further connected, at the opposition end from the outlet connection, to a sample transfer capillary through a membrane capillary, wherein the membrane capillary has an inner diameter not larger than the inner diameter of the sample transfer capillary, wherein the outlet transfer capillary, the membrane capillary and the sample transfer capillary are configured to be in fluidic communication through the membrane capillary.
9. The apparatus of claim 1, wherein the inlet transfer capillary has a length from about 10 mm to about 500 mm and is at least twice longer than the separation capillary, and wherein the inlet connection has zero dead volume.
10. The apparatus of claim 1, wherein the outlet transfer capillary is at least four times longer than the separation capillary, and wherein the outlet connection has zero dead volume.
11. The apparatus of claim 1, wherein the sponge material comprises cellulose, cellulose acetate, porous frit, cuprammonium RC, or a combination thereof.
12. The apparatus of claim 1, wherein the sponge material is formed in situ by contacting a basic solution with cellulose acetate gel to provide a regenerated cellulose sponge.
13. The apparatus of claim 1, further comprising a first reservoir for holding a first electrolyte, wherein the first reservoir is configured to be in fluidic communication with the inlet connection through the sponge material at the inlet connection.
14. The apparatus of claim 13, further comprising a first electrode, wherein the first electrode is configured to be in electric communication with the first electrolyte.
15. The apparatus of claim 13, further comprising a second reservoir for holding a second electrolyte, wherein the second reservoir is configured to be in fluidic communication with the outlet connection through the sponge material at the outlet connection.
16. The apparatus of claim 15, further comprising a second electrode, wherein the second electrode is configured to be in electric communication with the second electrolyte.
17. The apparatus of claim 16, further comprising an electric voltage power source, wherein the electric voltage power source is configured to be in electric communication with the first and the second electrode and wherein the separation capillary and the electric voltage power source are configured to form a closed circuit.
18. The apparatus of claim 15, further comprising a third reservoir, wherein the outlet transfer capillary is further connected, at the opposition end from the outlet connection, to a sample transfer capillary through a membrane capillary, wherein the membrane capillary has an inner diameter not larger than the inner diameter of the sample transfer capillary, wherein the third reservoir, the outlet transfer capillary, the membrane capillary and the sample transfer capillary are configured to be in fluidic communication through the membrane capillary.
19. The apparatus of claim 1, wherein the base comprises an optical aperture and wherein the separation capillary is aligned to the optical aperture.
20. The apparatus of claim 1, wherein the outlet transfer capillary is in fluidic communication with an analytic instrument, a separation device, or a combination thereof.
21. A system for separating a mixture, comprising,
an apparatus of claim 1, and
an imaging sensor, wherein the imagine sensor is configured to monitor the separation capillary.
22. The system of claim 21, wherein the imaging sensor comprises a linear charge coupled device or a linear complementary metal-oxide-semiconductor sensor, and wherein the imaging sensor is configured to be in electronic communication with an image analysis device.
23. The system of claim 22, further comprising a sample injection device in fluidic communication with the inlet transfer capillary.
24. The system of claim 23, further comprising an analytic instrument in fluidic communication with the outlet transfer capillary.
25. A method for making an apparatus for separating a mixture, comprising, affixing a separation capillary onto a base, wherein the separation capillary having a length from about 10 mm to 300 mm, wherein the separation capillary has a first end and a second end and wherein the separation capillary has a separation inner diameter and a separation outer diameter;

inserting an inlet transfer capillary having an inlet inner diameter and an inlet outer diameter into the first end to provide an inlet connection; and inserting an outlet transfer capillary having an outlet inner diameter and an outlet outer diameter into the second end to provide an outlet connection and wherein the first end is opposite from the second end, wherein the separation inner diameter is at least twice both the inlet inner diameter and the outlet inner diameter;

wherein the separation inner diameter exceeds the inlet outer diameter leaving a first space between the separation inner diameter and the inlet outer diameter; and wherein the separation inner diameter exceeds the outlet outer diameter leaving a second space between the separation inner diameter and the outlet outer diameter;

filling the first space and the second space with cellulose acetate gel, contacting a basic solution with cellulose acetate gel to provide a regenerated cellulose sponge, wherein both the first space and the second space are filled with the cellulose sponge, wherein the sponge material is configured to allow fluidic communication through the inlet connection and the outlet connection respectively, wherein the outlet transfer capillary has a length from about 30 mm to about 750 mm and is at least twice longer than the separation capillary; and wherein the inlet transfer capillary, the separation capillary, and outlet transfer capillary are configured to be in fluidic communication with each other.

26. The method of claim 25, further comprising connecting the outlet transfer capillary, at the opposition end from the outlet connection, to a sample transfer capillary through a membrane capillary, wherein the membrane capillary has an inner diameter not larger than the inner diameter of the sample transfer capillary, wherein the outlet transfer capillary, the membrane capillary and the sample transfer capillary are configured to be in fluidic communication through the membrane capillary.

27. The method of claim 25, further comprising constructing a first reservoir for holding a first electrolyte, wherein the first reservoir is configured to be in fluidic communication with the inlet connection through the sponge material at the inlet connection.

28. The method of claim 27, further comprising constructing a second reservoir for holding a second electrolyte, wherein the second reservoir is configured to be in fluidic communication with the outlet connection through the sponge material at the outlet connection.

29. The method of claim 28, further comprising
constructing a third reservoir; and
connecting the outlet transfer capillary, at the opposition end from the outlet connection, to a sample transfer capillary through a membrane capillary,
wherein the membrane capillary has an inner diameter not larger than the inner diameter of the sample transfer capillary, and wherein the third reservoir, the outlet transfer capillary, the membrane capillary and the sample transfer capillary are configured to be in fluidic communication through the membrane capillary.

* * * * *